United States Patent [19]

Kilgore et al.

[11] 4,051,427

[45] Sept. 27, 1977

[54] SUPERVISORY SYSTEM FOR DETECTING TORSIONAL OSCILLATION IN THE SHAFT OF A ROTATING ELECTRO-MECHANICAL SYSTEM

[75] Inventors: Lee A. Kilgore, Export; Edgar R. Taylor, Jr., Pittsburgh; William H. South, McKeesport, all of Pa.

[73] Assignee: Westinghouse Electric Corporation, Pittsburgh, Pa.

[21] Appl. No.: 518,915

[22] Filed: Oct. 29, 1974

[51] Int. Cl.² .................... H02H 7/06; G01M 7/00; G01H 1/08

[52] U.S. Cl. ............................ 322/99; 73/70.1; 361/1; 318/565; 364/801

[58] Field of Search ................ 317/13 R, 13 A; 318/561, 565; 322/11, 14, 4, 17–25, 28, 99, 100, 89; 73/67.2, 70, 70.1, 136, 11, 99, 67.1; 416/500; 415/119; 324/71 R; 340/261; 290/1 R, 40 C; 235/150.1, 150.3, 150.2, 184, 185

[56] References Cited

U.S. PATENT DOCUMENTS

| | | | |
|---|---|---|---|
| 2,842,108 | 7/1958 | Sanders | 235/150.1 X |
| 2,858,070 | 10/1958 | Scharff | 235/150.2 |
| 2,935,670 | 5/1960 | Gorrie | 235/150.1 |
| 3,284,615 | 11/1966 | Yetter | 235/150.1 |
| 3,575,636 | 4/1971 | Nantes et al. | 317/13 |
| 3,693,402 | 9/1972 | Jones | 73/70.1 X |
| 3,758,762 | 9/1973 | Littman et al. | 318/561 X |
| 3,783,680 | 1/1974 | Mason | 73/70 X |
| 3,842,661 | 10/1974 | Marshall et al. | 73/67.1 |

FOREIGN PATENT DOCUMENTS

565,471   11/1958   Canada .................... 235/184

Primary Examiner—Robert J. Hickey
Attorney, Agent, or Firm—M. J. Moran

[57] ABSTRACT

An analog simulator for simulating the mechanical resilience, mass and damping characteristics of a turbine-generator system. The aforementioned parameters are represented by inductance, capacitance and resistance in the simulating system. Electrical power at the output of a generator is sensed by a power transducer and is provided as input to the simulating system. The power is a measure of the torque on the shaft of the generator. The simulating system computes the torsional oscillations between rotating members of the turbine-generator system and provides electrical output signals which are related to the magnitudes and frequencies of the various computed torsional oscillations. The signals are provided to indicating means such as counters, strip recorders and oscillographs for recording the timing, magnitude, and frequency of the various torsional oscillations. The signals are also provided to shut-down means so that the turbine-generator may be shut down if the torsional oscillations are of sufficient magnitude to damage the system shaft.

12 Claims, 5 Drawing Figures

SUPERVISORY SYSTEM FOR DETECTING TORSIONAL OSCILLATION IN THE SHAFT OF A ROTATING ELECTRO-MECHANICAL SYSTEM

CROSS REFERENCE TO RELATED APPLICATIONS

The subject matter of this application is related to the subject matter of related application Ser. No. 466,318 filed May 2, 1974 by W. H. South and L. A. Kilgore entitled "Dynamic Stabilizer for Synchronous Machines Having Torsional Oscillations and Method." The latter application is assigned to the same assignee as in the present case.

BACKGROUND OF THE INVENTION

This invention relates generally to control and supervision of electromechanical devices which have internal parts which are capable of moving or oscillating relative to one another. This invention relates specifically to supervisory control and indicating systems for turbine driven, high power, alternating current, synchronous generator systems which may be subjected to torsional oscillations in the shaft thereof.

It has been found that in long line electrical transmission systems of the type where the electrical generators are driven from power sources such as steam turbines, multiple rotating masses may be present on a single shaft. As an example, the rotating mass of one or more turbines and the rotating mass of an exciter for an AC generator as well as the rotating mass of the generator rotor may be present on the same shaft. Because of the mechanical properties of the various parts of the rotating system, torsional oscillations along the shaft may be possible at any time between any combination of the masses. If these torsional oscillations were to become large and undamped they could cause shaft breakage. It has been found in certain applications that such undamped torsional oscillations may exist because of the electrical properties of the AC synchronous generator electrical system. As an example, when long transmission lines are required for the delivery of energy to an electrical grid network or load the inductive effect of the long transmission lines may require series capacitive compensation. However, the effect of the compensating capacitors connected in series circuit relationship with the inductance of the long transmission line may tend to cause certain resonant frequencies to exist in the output electrical circuit of the AC generator. These resonant frequencies may be reflected through the magnetic coupling between the stator and rotor of the synchronous generator to the mechanically rotating shaft. If the previously described electrical resonant frequency occurs at a critical mechanical resonant frequency between any of the masses of the turbine-generator system, reinforced undamped torsional oscillation may occur in the shaft which may be of sufficient magnitude to break the shaft. Apparatus and methods for solving this problem have been proposed in the previously described copending application Ser. No. 466,318 and in U.S. Pat. No. 3,662,251 issued May 9, 1972 to O. J. M. Smith entitled "Method and System for Measuring Acceleration and Velocity." This latter patent is related to the sensing of the oscillation of the shaft and the operation thereupon. A similar method and apparatus is described in U.S. Pat. No. 3,662,252 issued May 9, 1972 to O. J. M. Smith and entitled "Tachometer and Method of Obtaining a Signal Indicative of Alternating Shaft Speed." Apparatus for measuring angular displacement are taught in U.S. Pat. No. 3,208,274 issued to R. C. Rosaler on Sept. 28, 1965 and U.S. Pat. No. 3,505,865 issued to G. A. Kihlberg et al on Apr. 14, 1970. Similarly, apparatuses for measuring torque are taught in U.S. Pat. Nos. 2,675,700 issued to T. C. Van Dergrift et al on Apr. 20, 1954; 2,634,604 issued to L. F. Hope on Apr. 14, 1953; and 3,194,065 and issued to M. W. Wilson on July 13, 1965; and likewise a slip indicator is taught in U.S. Pat. No. 2,387,901 issued to S. A. Haverstick on Oct. 30, 1945. Each of the latter aforementioned patents teaches methods and/or apparatus for determining various parameters associated with rotating electrical machinery. It would be advantageous if an apparatus and a method could be developed for utilizing a relatively easily measured parameter of a rotating electro-mechanical system in conjunction with an analog computer model of that system to thereby provide information about other portions of the electro-mechanical system by utilizing the information readily available at easily accessible parts of the model.

SUMMARY OF THE INVENTION

In accordance with the invention, a supervisory system is provided for sensing relative movement between mass components of an electro-mechanical system and providing this information to a model of the previously mentioned electro-mechanical system. The model is so adjusted as to take the previously mentioned signal and utilize it to provide other signals which are indicative of other motion characteristics of the actual electro-mechanical system. This eliminates the need to make numerous measurements in the actual electro-mechanical system. For the previously mentioned simulated signals to accurately reflect actual values in the electro-mechanical system it is necessary that the model be an accurate model and be periodically compared with the actual electro-mechanical system to maintain a high degree of similarity between the simulating system and the actual electro-mechanical system. A comparator device which measures the actual speed of the electro-mechanical system and compares it with the simulated speed from the model is utilized to check for error. An error correcting feedback signal is provided from the comparator system to the simulating system to adjust parameters therein when the error between the two speed signals differ by greater than a predetermined amount. In a preferred embodiment of the invention, a steam-turbine, synchronous, electrical generating system is provided with a control system comprising an analog computer. The output electrical power of the generator in terms of real power or watts is measured by utilizing current and voltage transformers on the output line of the generator to produce a voltage signal which is proportional to the output power of the generator which in turn is proportional to the power of the shaft of the generator which in turn is proportional to the torque on the shaft of the generator. Consequently, the output signal of the watts transducer is proportional to the torque on the shaft of the generator. This signal is provided to the analog computer where inductive, capacitive and resistive elements are utilized in at least one embodiment of the invention to represent the mass, shaft resilience and mechanical damping of the turbine system. By tapping into various parts of the analog computer, signals which are representative of local shaft torques between any masses of the system may be obtained. It can therefore be seen that useful functions are provided by the present invention. As an example, torsional oscillation on the common shaft between two masses which may be the rotors of two steam turbine stages may be simulated by utilizing the analog computr supervisory model. It would be difficult to actually measure the actual torsional oscillations because of the heat and the pressure in the turbine chamber. The simulated torsional oscillation will give an indication of the frequency of oscillation, the peak value of oscillation and the effect of faults in the electrical system upon the oscillation. This information can be provided to level detectors where only those peak values over certain predetermined values (which values may be related to the yield strength of the actual shaft) are counted and recorded. At other times, the information may be provided to an oscillograph where it is faithfully reproduced by the oscillographic movement. The information may also be provided to a comparator which will compare the oscillations with a variable reference and provide a trip signal to open a circuit breaker in the output circuit of the generator and to close valves in the steam paths of the turbine system to thereby shut the entire system down should certain conditions exist which requires shut-down. As an example, if the torsional oscillation on a portion of the shaft of the turbine-generator system approaches the yield strength of the shaft a shut-down could be initiated. The supervisory system may provide another function in that a reactive power transducer sometimes known as a VAR transducer may be utilized to sense the occurrence of a fault in the output circuit of the generator. The fault is not necessarily damaging to the shaft of the mechanical system driving the generator. However, it would be useful to note the effects of the electrical fault as it is propagated backwards through the electrical generator into the mechanical portions of the system. It would also be useful to provide a signal to the previously described comparator which would prevent shut-down in the event of a fault. This is not to say that a circuit breaker in the output circuit of the generator would not open, it is merely to say that the mechanical system would not necessarily be shut down, even if a circuit breaker is opened, it being understood that once the fault is cleared the breaker can be reclosed and the electrical power can be quickly provided to the load once again. Generally, a short term fault as it propagates from the electrical system back into the mechanical system will not necessarily cause excessive damage in the mechanical system provided it is relatively quickly reduced. This quick reduction is usually accomplished by clearing the fault with the circuit breaker of the generator system. The fault detector circuit can be utilized to trigger or enable the previously described oscillograph so that as the effect of the fault is propagated through the shaft thus causing short term torsional oscillations these oscillations may be graphically depicted by the oscillograph.

BRIEF DESCRIPTION OF THE DRAWINGS

For a better understanding of the invention reference may be had to the preferred embodiment, exemplary of the invention shown in the accompanying drawings, in which.

DESCRIPTION OF THE PREFERRED EMBODIMENTS

Figure 1:
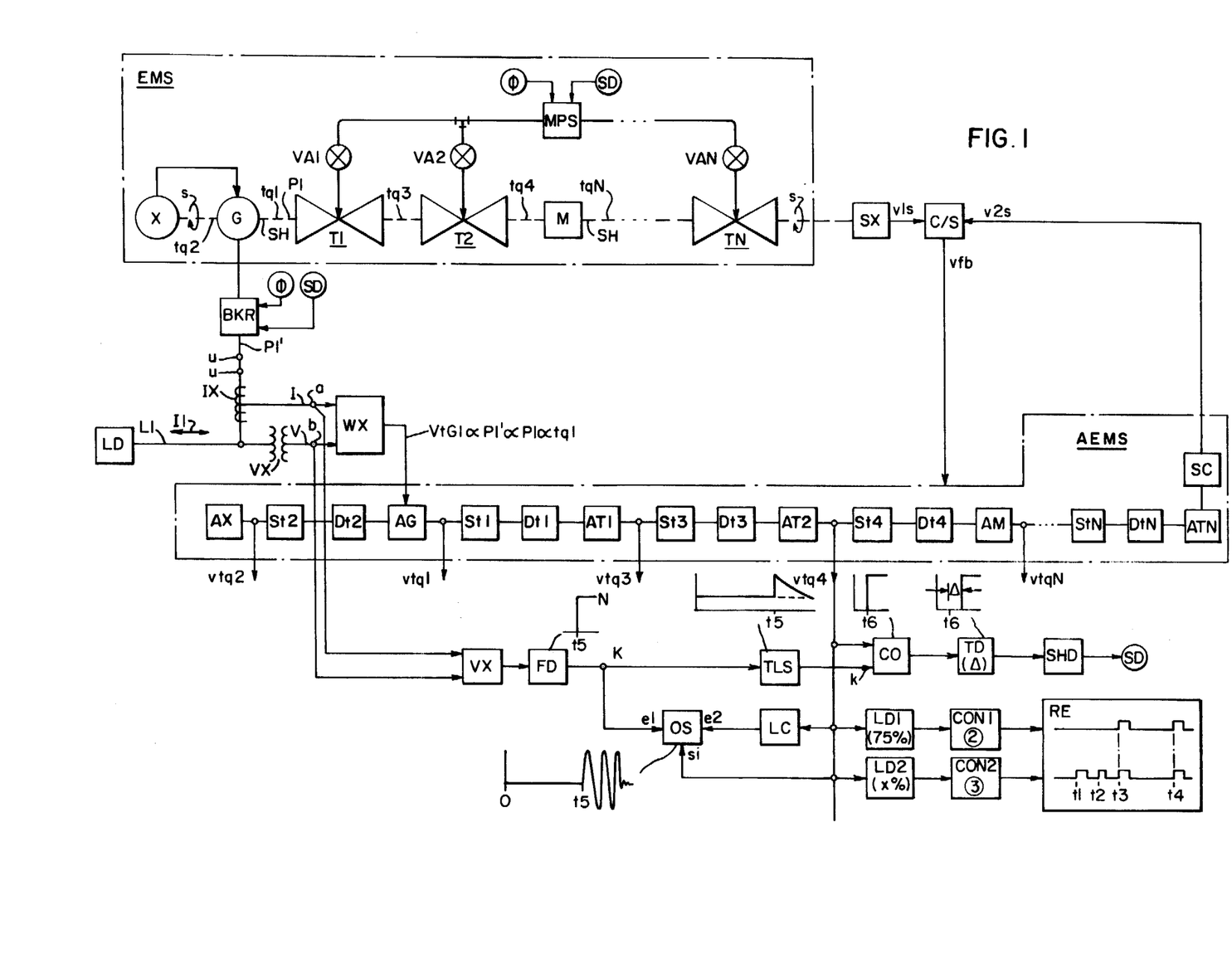
FIG. 1 shows an overall block diagram of a supervisory system for a steam turbine-generator power generating system.

Referring now to the drawings and FIG. 1 in particular, a supervisory system for simulating the movement characteristics of an electro-mechanical system is shown. The system has mass portions therein which are interconnected by mechanically damped resilient means which resilient means allow the mass portions to move relative to one another under certain operating conditions. The supervisory system comprises a detecting means which is interconnected with the electro-mechanical system and which is utilized for detecting at least one movement characteristic of the electro-mechanical system. The detecting system or means provides an output signal which is related to the previously described movement characteristic. There is also present a simulating means which is adjustable to represent the mechanical characteristics of the previously described electro-mechanical system. The previously described output from the detecting means is provided to the simulating means where it interacts therewith to represent the mechanical characteristics of the electro-mechanical system, to thereby simulate the status of at least one movement characteristic of the electro-mechanical system.

More specifically, FIG. 1 shows an analog supervisory system for simulating the torsional oscillation characteristic of an electro-mechanical power generating system where the latter system has rotatable masses which are interconnected by a rotatable shaft and where the shaft has mechanical resilience. The system also has mechanical damping. The mechanical resilience, the mechanical damping and the masses have the capability of causing torsional oscillations in the shaft in local regions of the shaft when the shaft rotates or moves. The previously described detecting means is utilized to detect shaft torque in one local part of the shaft and thus provide an output signal which is related to that local shaft torque. The simulating means comprises an analog simulating means adjusted to represent the mass, damping and resilience of the electro-mechanical system. The previously described detecting means output signal is provided to the analog simulating means to cause the analog stimulating means to simulate torsional oscillation in the shaft relative to any of the masses. It is important to realize with respect to the present invention that the actual torque of one part of the shaft can be directly or more preferably indirectly measured by the detecting means and then provided as an input signal to the simulating means. The simulating means is so modeled as to give indications of torque or other movement parameters of the shaft at other places on the shaft in addition to the previously described local place.

Even more specifically, FIG. 1 shows an electro-mechanical system EMS which is interconnected by way of power line L1 and a transducer WX to an analog simulating means AEMS. In addition, in at least one embodiment of the invention, the actual speed s of the shaft SH of the electro-mechanical system EMS is compared with the simulated speed voltage signal v2s of the model or simulating means AEMS. This provides feedback for adjustment of portions of the analog simulating means AEMS so that automatic or semi-automatic adjustment of the parameters of the analog simulating means AEMS may be made to make it more closely simulate the actual mechanical system EMS. The electro-mechanical system EMS may comprise for example, a generator G which may be a synchronous alternating current generator having the previously mentioned rotatable shaft SH which is interconnected with an exciter X and at least one and perhaps a plurality of turbine sections. As an example, a turbine T1 and a turbine T2 may be provided, along with a turbine TN, it being realized that any number of other turbine stations, within practical limit, may be provided on the shaft SH. A rotating mass M is also provided which represents all of the other rotating masses of the system. The turbines may be of the low pressure type and/or the high pressure type and may be of the steam, gas or water type or any other suitable type. There are shown schematically valves for each turbine, as an example a valve VA1 is shown for controlling the steam or driving fluid applied to the driving stage of the turbine T1, a valve VA2 is shown for controlling the steam or driving fluid applied to the driving stage of the turbine T2 and a valve VAN is shown for controlling the steam or driving fluid applied to the driving stage of the turbine TN. A mechanical power supply MPS is provided to supply the previously described driving media to the turbines, it being understood of course that other forms of turbine drive energy may be provided such as by other forms of expansive gas. The mechanical power supply MPS may comprise a steam boiler. The mechanical power supply MPS may be controlled by two control functions generally designated $\phi$ and SD. In operation the common shaft SH rotates with a speed $s$. For reasons previously described with respect to copending related application Ser. No. 466,318, local shaft torques $tqN$ through $tqn$ may be or exist periodically or continuously at different local parts of the shaft SH. In addition the torques may exist between serially connected shaft masses or between any shaft masses. For convenience of illustration, a torque $tq1$ is shown between the generator G and the turbine section T1 on the shaft SH. Likewise, a torque $tq2$ is shown between the generator G and exciter X. In a similar manner, torque $tq3$ is shown between turbine section T1 and turbine section T2. Likewise, a torque $tq4$ is shown between turbine section T2 and the rotating mass M and finally a torque $tqN$ is shown between the mass M and the turbine section TN, it being realized that all these torques may periodically increase or decrease or may oscillate with the same or different frequencies or may all be present at the same time with different frequencies and amplitudes or may be present in any combination with different frequencies and amplitudes. It is also to be realized that the torques may be time related with respect to each other and may be related to the electrical characteristics of the load LD and the line L1 which is supplied with electrical power by the generator G or other system generators (not shown).

There is shown schematically connected into the line L1 a main circuit breaker BKR, it being realized that this need not necessarily be the only circuit breaker or circuit interrupter in line L1. There may also be terminals u—u having an interconnecting link between them in the line L1. The utilization of the terminals u—u may be for the purpose of installing portions of the "Dynamic Stabilizer for Synchronous Machines . . . ." described in copending application S.N. 466,318. There may also be connected in line L1 a current transformer IX which may provide a current I related to a current I1, which may be flowing in line L1 at any instant of time, to a watts transducer or real power measurement instrument WX. There may also be connected in relationship with line L1 a voltage transformer or voltage measuring means VX which may provide a voltage signal V, which is related to the line voltage, to the watts transducer or real power measurement instrument WX. Current I and voltage V are utilized in the watts transducer WX to provide an indication of the real power P1' in the line L1. The real power P1' in the line L1 is related to the power P1 of the rotating shaft SH in the local vicinity of the generator G. The mechanical power P1 of the rotating shaft SH is related to the torque $tq1$ at the shaft SH by the speed $s$. It is known that the relationship betwen power and torque is: power is equal to torque times speed, $P = Ts$.

The torques $tq1$ and $tq2$ represent the total mechanical torque applied to the generator G and consequently the mechanical power applied to generator G. Electrical power P1' represents the total electrical power flowing from the generator G. In order for the speeds of the turbine generator to remain constant, the average mechanical power must equal the average electrical power (neglecting the small losses in the machines). Even though the average power in the electrical and mechanical system is the same, there may be instantaneous differences in power which tend to accelerate and decelerate the inertia of the generator rotor. Since the mechanical power that is generated by the turbine elements T1, T2, TN cannot change at a fast rate due to the dynamic limitations of the control valves VA1, VA2, VAN, the input mechanical power can be considered constant for periods of time equivalent to the natural torsional oscillation of the shaft rotating elements.

Electrical power P1' can be thought of as being made up of two parts, a DC signal of relatively constant valve and a superimposed AC signal which changes. The DC signal part of P1' represents the electrical power that is equal to the relatively constant mechanical power of the turbine elements. The AC signal, part of P1', represents the power that is accelerating and decelerating the inertia of the generator. Since it is only the AC power signal that is of interest for oscillations, the DC power signal may be disregarded.

It should be recognized that even though the DC power in the system does not contribute to any oscillations, it does bias the system with steady torques in the various parts of the shaft. This bias can slightly effect the mechanical properties of the shaft and hence slightly change the response of the system to the AC signal depending on the magnitude of the DC signal. Additional sophistication can be added to measure the DC power in the system and make slight corrections to the systems response to AC signals.

There may be provided as part of the supervisory system an analog computer model or simulator AEMS which is set up or programmed to generally faithfully represent within limits the mechanical characteristics of the previously described electro-mechanical system EMS. In some embodiments, the simulator AEMS may comprise a digital computer. Watts transducer WX is connected to measure the instantaneous electrical power P1' and pass only the AC component of this power V$t$G1 to the generator element AG in the analog computer model AEMS. It is known that the electrical properties of portions of an analog computer may be utilized to model or provide mathematical representations of mechanical phenomena. In the present case, the previously described rotating masses, shaft resilience and shaft damping characteristics of the electro-mechanical system EMS may be generally faithfully represented by electrical inductance, capacitance and resistance in the analog computer model AEMS. In a preferred embodiment, the rotating mass of the exciter X may be electrically represented by a functional block AX. The rotating mass of the generator may be represented by the functional block AG. Between the latter two functional blocks may be a block representing the spring characteristics or the resilience characteristic St2 of the shaft SH between the exciter X and the generator G. Also present may be a functional block Dt2 which represents mechanical damping between the exciter X and the generator G. In a like manner, the rotating mass of the turbine T1 may be represented by a functional block AT1. There may be a shaft spring or resilience functional block St1 and a shaft damping functional block Dt1 between the turbine mass functional block AT1 and the generator mass functional block AG. Similarly, there may be a second turbine rotating mass functional block AT2. There may be a shaft spring or resilience functional block St3 and a shaft damping functional block Dt3 between the functional blocks AT1 and AT2. Furthermore, there may be a rotating mass functional block AM. There may also be a related shaft spring or resilience functional block St4 and a related shaft damping functional block Dt4 between the latter mentioned rotating mass functional block AM and the turbine functional block AT2. Finally, there may be a functional block ATN to represent the rotating mass of the turbine TN. There may be a shaft spring or resilience functional block StN and a damping functional block DtN between the latter mentioned functional block ATN and the rotating mass functional block AM.

Utilized in conjunction with the previously mentioned functional blocks is a speed converter functional block C/S which provides the output signal $v2s$ which gives an electrical indication of the simulated speed of the shaft of the turbine. It is to be understood that with respect to the analog simulator AEMS that the serial arrangement of functional block is merely illustrative and not limiting. The electrical circuit components which may represent the model of the elements in the electro-mechanical system EMS may be connected in various combinations of series and parallel arrangements.

There is shown disposed in the analog system AEMS output taps or connections designated vtgl through vtqN. The various signals vtq1 through vtqn represent computed simulated machine characteristics for the electro-mechanical system or turbine-generator system EMS. As an example, in the preferred embodiment of the invention the signals are voltage signals and they represent instantaneous torsional oscillation components at local portions of the shaft. Consequently, the voltage signal vtq2 represents the instantaneous torsional oscillation between the exciter X and the generator G. The voltage signal vtq1 represents the instantaneous torsional oscillation between the generator G and the turbine T1. Similarly, the voltage signal vtq3 represents the instantaneous torque between the turbine T1 and the turbine T2. In a like manner, the voltage signal vtq4 represents the instantaneous torque between the rotating mass of the turbine T2 and the rotating mass M. Finally, the voltage signal VtqN represents the instantaneous torque at any instant of time between the rotating mass M and the final turbine stage TN. The previously described output signals vtq1 through vtqN may be utilized to provide supervisory and control functions for the electro-mechanical system as will be discussed hereinafter.

A speed transducer SX may be provided to monitor the speed s of the shaft SH of the electro-mechanical system or turbine generator system EMS. The speed transducer SX provides a voltage or other electrical system v1s which is related to the speed s of the shaft SH. This signal may be provided as one input to a comparator and synchronizer means or circuit C/S. The previously described simulated speed signal $v2s$ may also be provided as another input thereto. An output or feedback signal vfb may be provided from the comparator and synchronizing circuit C/S to the simulating circuit AEMS to provide correction or adjustment of parameters of the simulating means or circuit or computer AEMS such that the speed signal $v2s$ becomes substantially equal to the voltage signal v1s at any instant of time within a predetermined tolerance range. The closer the two previously described signals $v1s$ and $v2s$ come to being equal, the more likely it is that the simulating output signals $vtq1$ through $vtqN$ are an accurate representation of the corresponding instantaneous torques tq1 through $tqN$ of the shaft SH of the turbine generator system EMS.

Figure 1A:
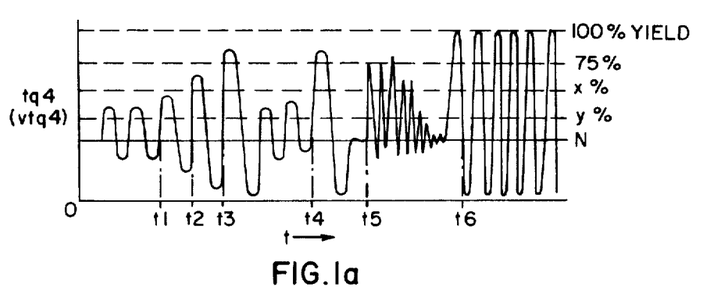
FIG. 1a shows a graph of an illustrative shaft torsional oscillation.

Referring now to FIG. 1a, in a preferred embodiment of the invention and for convenience of illustration the previously described voltage signal $vtq4$ which represents the actual instantaneous torque $tq4$ in the shaft SH is shown in a typical but not limiting graphical representation. In the graph of FIG. 1a, the ordinate is utilized to concurrently depict the torque $tq4$ of the shaft SH and the output voltage signal $vtq4$ from the simulator. It is to be understood that the graph is illustrative only and the actual correspondence or coincidence of the two curves may vary. Time is measured on the horizontal axis. The generally constant torque of the shaft SH of the mechanical system is depicted by the generally horizontal straight line N. In a typical turbine-generator system, the shaft speed may be 3600 revolutions per minute. Shown superimposed upon the constant torque level line N is a curve showing a hypothetical torsional oscillation characteristic for the torque $tq4$. Also superimposed upon the graph is a plot of a hypothetical yield characteristic of the shaft SH. 100% yield is shown at the top, followed below by a 75% yield line, a yield generally designated $x\%$, and finally a yield generally designated $y\%$. Yield is that point at which the shaft will fracture or go into plastic flow. Naturally, it can be seen as the torsional oscillations occur they occasionally approach the higher yield region and in some instances may remain in a high yield domain for a long period of time, this tends to cause the shaft to become dangerously weakened or approach a fracture or elastic flow state. It has been determined that a shaft can be subject to lower level yield impulses or oscillations a certain number of times during the life of the shaft without seriously affecting the strength or material characteristic of the shaft. However, higher torque oscillations or impulses such as at the 75% yield level can only be tolerated for a few times in the life of the shaft and perhaps cannot be tolerated at all for an extended period of time. A potential characteristic for the torque $tq4$ on the shaft SH is depicted in the graph, it being realized that this depiction is merely illustrative and not limiting in any way. In an illustrative example, at a time close to zero, relative to any particular instant of time at which measurement begins, the deviation of torque about the normal or average torque line N is low with perhaps a constant frequency of relatively low value. However, at time $t1$ an increased torsional oscillation occurs which may stress the shaft in the region between the x% and 75% yield characteristics. A similar oscillation or impulse may occur at time $t2$. At time $t3$ an increased impulse may occur which may approach or exceed the 75% yield characteristic of the shaft. It can be seen that after that occurrence the oscillations may revert to a relatively low level. At a time $t4$ an approach to the 75% level and beyond is shown once again. At time $t5$, a high frequency torsional oscillation is shown being exerted on the shaft SH due to the occurrence of an electrical fault in the line L1. At a time $t6$ a high level oscillation is shown on the shaft significantly above the 75% yield level and perhaps even approaching the 100% yield level where shut-down is necessary because emanent structural damage to the shaft SH is a present danger. The utilization of these illustrative torsional oscillation characteristics will be described hereinafter.

Supervisory and Shut-Down System

The previously described informational signals vtq1 through vtqn may be utilized for many purposes associated with the supervision and control of the electromechanical system EMS. As a non-limiting example of utilization, one channel of usage or control is shown illustrated in FIG. 1. The utilization circuit may comprise a VAR transducer VX which may otherwise be known as a reactive power transducer. The reactive power transducer VX is connected at terminals $a$ and $b$ to the previously described current transformer IX and voltage transformer BX respectively. The VAR transducer measures the reactive component of the electrical power P1' in line L1, it being presumed that the presence of a strong reactive component of power is a significant indication of fault in an electrical system. Connected to the output of the VAR transducer XV is a fault detector FD which has the characteristic of providing as an output signal a step function signal or a step increase in voltage or current as the case may be as the input to the detector FD is raised above a certain predetermined level. The output of the fault detector FD may be connected simultaneously to the input of a trigger level signal generator TLS and to the input of an oscillograph OS. The trigger level signal generator TLS provides a step increase at its output terminal in correspondence to a step increase at its input terminal such as might be provided by the output signal from the previously described fault detector FD. The output signal of the trigger level signal generator TLS however decays to a normal value after a short period of time. This latter output signal is provided to one input terminal $k$ of a comparator CO. To the other input terminal of the comparator CO may be provided the previously described simulator AEMS output signal $vtq4$ for example. The comparator output signal is a step function in nature that is, a discrete output is provided when the difference between the two previously described comparator input signals reaches a predetermined level. The comparator output signal may be provided to a time delay circuit TD having a time delay ($\Delta$). The output of the time delay circuit TD may be provided to a shut-down circuit SHD which provides an output signal SD. The output signal SD may comprise the enabling or actuating signal for the mechanical power supply MPS of the electro-mechanical system EMS and/or may also comprise an enabling or actuating signal for the previously described breaker BKR or interrupter in the line L1. Under certain operating conditions therefore the presence of the output signal SD may cause the mechanical power supply MPS to cease producing steam or other driving fluid for the turbines T1 through TN and the breaker BKR may be opened to protect the line L1 and the load LD. This will accomplish a shut-down function in the mechanical and electrical portions of the electro-mechanical system EMS.

The output signal $vtq4$ may also be simultaneously supplied to a level comparator LC which will provide a signal to the oscillograph OS at an enabling terminal $e2$. The level comparator LC will provide the enabling signal to the oscillograph OS when a certain predetermined amplitude or frequency characteristic of the signal $vtq4$ occurs. The simulating signal $vtq4$ is also provided to the signal channel $si$ of the oscillograph for recording. The previously described output signal $vtq4$ may also be provided to a level detector LD1 which may be set to a specified value of yield for the shaft SH as depicted in the previously described graph of FIG. 1a. A typical value may be 75%. The output of the level detector may be connected to a counter or counting means CON1, the output of which may be connected to an input channel or signal channel of a recorder RE. In a like manner, the signal $vtq4$ may be connected to another level detector LD2 which may represent the x% level of yield. The output of the level detector LD2 may be connected to a second counter CON2, the output of which may be connected to another channel of the previously described recorder RE. The recorder RE when utilized provides an indication either directly or indirectly of the actual number of times that a torsional oscillation exceeds the level set on the respective level detectors connected to the respective channels of the recorder RE. The counters provide a cumulative count of the number of times this occurs. This may be in the form of a digital readout or the like. The recorder RE provides timed relationships of the counts to show when they occur relative to real time and to each other. Other level detector channels may also be connected to the $vtq4$ simulating signal as desired. It can be seen that the branch including the comparator CO, the time delay means TD and the shutdown means SHD provides a control function whereas the branches comprising the level comparator LC, the level detectors LD1 and LD2, the counters CON1 and CON2 and recorder RE provide a supervisory or indicating function with no direct feedback to the electro-mechanical system EMS. It is to be understood, of course, that the inventive concept is not changed by removing some of the channels or functions, by replacing the channels or functions with other appropriate functions as the case or situation may warrant, or by adding other functions. The supervisory and control system as shown is illustrative and not limiting and depicts the usefulness of the simulating function of the analog simulating means AEMS. It is to be understood that the channels represented by the signals vtq1 through $vtqN$ may have similar control and supervisory functions connected thereto.

In operation, the level detector LD1 will only detect those peaks, impulses or oscillations which exceed the 75% yield value. Ignoring the effects of a fault and shutdown indicated at t5 and t6 for the present, such occurrences are shown at t3 and t4 in the graph of a FIG. 1a. The counter CON1 indicates the number "2" to show that two occurrences have taken place and the recorder RE indicates the occurrences in the channel corresponding to the level detector LD1 at the times t3 and t4. Consequently, not only are the total number of occurrences above 75% yield indicated but the intervals between them are also shown. The level detector LD2 will show all the occurrences above x%. In this case, three occurrences have occurred above x% and that is depicted by a "3" on the output indicator of the counter CON2. The channel of the recorder RE corresponding to the level detector LD2 shows three indications one each at t1, t3, t4. This arrangement provides a permanent record of the number of times a yield zone is reached or exceeded plus a visual indication of the timing or spacing between the occurrences. The oscillograph OS and level comparator LC cooperate to provide a visual indication of unusual phenomena which occur in a yield zone above a predetermined level. As an example, at the time t5 a fault may have been introduced into the line L1 which would have a tendency to feed back into the mechanical portions of the electro-mechanical generating system EMS and thus cause torsional oscillations. It may be desirous to observe an oscillation at a place such as the shaft region between the turbine T1 and the turbine T2 or the shaft region between the turbine T2 and that rotating mass M. Once the oscillation or impulse has exceeded a certain level, which for example may be y% of yield the level comparator will provide a signal to turn on the oscillograph OS to record the entire oscillation characteristic within the range. In a like manner, if a fault in the electrical system is detected by utilizing the VAR transducer XV and the fault detector FD, the oscillograph OS may be turned on ahead of time so as to record the propagation effect of that fault as it moves through the mechanical system.

The VAR transducer VX and fault detector FD provide another function and that is to provide a triggering signal to the trigger level signal generator TLS. The output of the last named trigger level signal generator TLS is provided to the reference terminal k of the comparator CO. Normally this is set at a certain predetermined level and as a result the voltage signal vtq4 is always compared against the reference k. If the signal vtq4 exceeds a predetermined amount or value the output signal is provided to the time delay means TD and then to the shut-down means SHD to cause the electro-mechanical system EMS to be shut down. However, under certain conditions such as an electrical fault condition it is recognized that the fault can be corrected with electrical circuit breaker equipment in the line L1 such as by actuating the breaker BKR. Consequently, if a fault occurs in the line L1, it may introduce torsional oscillation for a short period of time into the mechanical system which would tend to trigger the comparator CO to cause a shutdown. This can be avoided by changing the reference on the comparator CO for a short period of time or until the fault has been dissipated in the mechanical portion of the system EMS or has been removed from the electrical portion. The trip level signal generator TLS provides this floating reference signal (of higher value) for a short period of time so that the difference between the voltage on the reference terminal k of the comparator CO and the signal terminal thereof is not large. Consequently, shut-down will not occur in the electro-mechanical system EMS.

Figure 2:
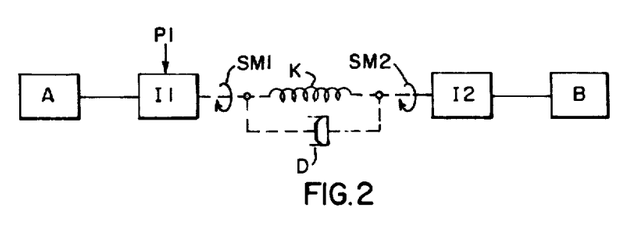
FIG. 2 shows a mechanical representation of a rotating mass system.

Referring now to FIG. 2, there is shown a schematic mechanical representation of a rotating system comprising two inertial masses I1 and I2 having disposed therebetween a torsionally flexible shaft having a spring constant K and a torsional damping characteristic indicated by the dashpot D. Local regions of the shaft are capable of rotating at different speeds generally designated SM1 and SM2. A forcing function generally designated P1 is shown being supplied to one of the inertial masses I1. Certain differential equations can be identified with respect to the interaction of the elements of FIG. 2. These equations are as follows:

$$TM = Ids/dt$$

$$TS = K \int (SM1 - SM2) \, dt$$

$$TD = Ds$$

where $TM$ equals the torque due to a rotating mass, $TS$ equals the torque due to spring resilience, $TD$ equals torque due to damping and $s$ equals shaft speed.

Figure 3:
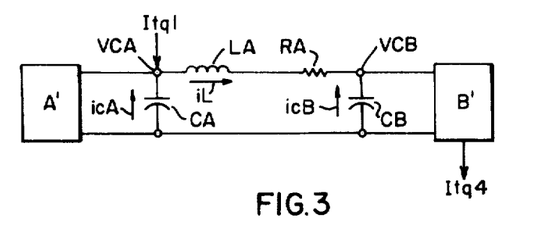
FIG. 3 shows an electrical analog for the system of FIG. 2.

Referring now to FIG. 3, there is shown an electrical circuit comprising passive circuit elements such as capacitors, inductors and resistors. In this case, there is a capacitive element CA connected in circuit relationship with series inductive element LA and series resistive element RA. There is connected in circuit relationship with the latter mentioned inductive and resistive elements a second capacitive element CB. Voltages VCA and VCB are impressed across capacitive elements CA and CB respectively. There is a left circuit portion A' and a right circuit portion B'. It is to be presumed that the left circuit portion A' and the right circuit portion B' comprise circuits similar to those shown in the intermediate portion. These previously described circuits are shown as functional blocks merely for convenience of illustration. It is well known that certain relationships exist between the current, voltage and impedance characteristics of the circuit elements shown in FIG. 3. These equations are shown below:

$$i_c = C (dv_c/dt)$$

$$i_L = 1/l \int (V_L) \, dt$$

$$i_R = V_R/R$$

where $i_c$ is capacitor current, $V_c$ is capacitor voltage drop, $i_L$ is inductor current, $V_L$ is inductor voltage drop, $i_R$ is resistor current and $V_R$ is resistor voltage drop. By comparing the latter equations with the previously described equations associated with FIG. 2, it can be shown that certain mechanical characteristics can be represented by analogous electrical characteristics if the constants and variables are given certain meanings and values. In this case, the analog circuit of FIG. 3 can be used to simulate the mechanical circuit of FIG. 2. If i or current is made equivalent to torque and V or voltage is made equivalent to speed, then the following constant relationships must hold:

$$I = C$$

$$K = 1/L$$

$$D = 1/R$$

By utilizing the above described relationships, the electrical circuit of FIG. 3 can be used as a passive analog circuit representation for simulating the circuit of FIG. 2. In the latter case, $Itq1$ is equivalent to the forcing function P1 and $Itq4$ is a simulated torque.

Figure 4:
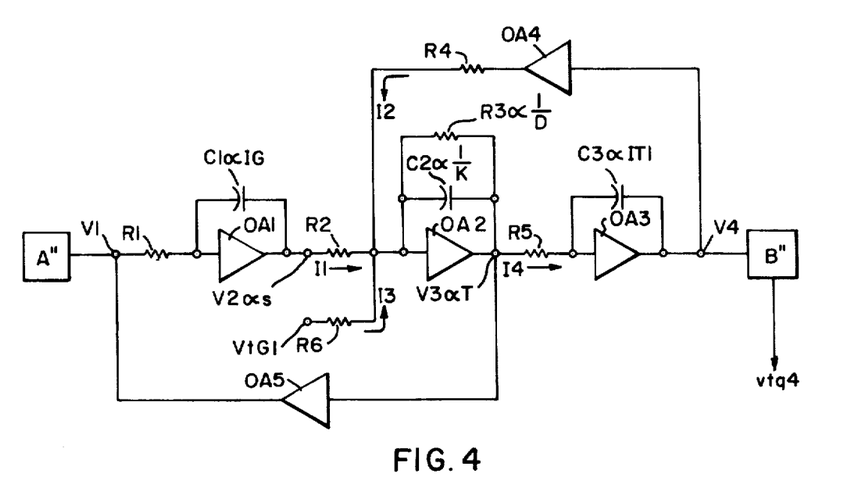
FIG. 4 shows another electrical analog for the system of FIG. 2.

Referring now to FIG. 4 there is shown an active analog circuit which may be used to simulate or represent the circuit of FIG. 2. Although it is to be understood that the circuit of FIG. 2 deals with inertial moments it can be seen by examination that the circuit of FIG. 2 represents a portion of the mechanical circuit EMS shown in FIG. 1. Certain equations concerning analog computer circuits utilizing operational amplifiers as portions thereof are as follows:

$$i = V/Ri$$

$$V\text{out} = (1/RiC) \int (V\text{in}) \, dt$$

$$V\text{in } V\text{in} = RiC \, (dV\text{out}/dt)$$

One other electrical circuit equation which is of importance is shown below:

$$Vc = 1/C \int (i1 - i2) \, dt$$

Vin is the input voltage to an operation amplifier and Vout is the output voltage, thereof $i1$ and $i2$ are currents into a node. Combining the electrical characteristics of the last named electrical circuit equation and the electrical circuit equations associated with FIG. 3 and then comparing them with the analog circuit equations previously described, it can be seen that torque is generally proportional to voltage, inertia or rotating mass is generally proportional to RC, the spring constant K is generally proportional to 1/RC and damping is generally proportional to 1/R. Such being the case, the analog circuit of FIG. 4 can be utilized as the analog simulating circuit AEMS shown in FIG. 1. In the present case there is a left circuit portion A" and a right circuit B" which essentially contain circuit constructions similar to the one shown connected between the last named portions. Also in this case, there is shown a scaling resistor R1 connected along with a capacitive element C1 in integrating circuit relationship with an operational amplifier OA1 where the resistance and capacitance are proportional to the inertia of the generator G. There is also a scaling resistor R2 which is used to convert the output voltage V2 from the first operational amplifier OA1 to a current I1. The voltage V2 is proportional to shaft speed $s$ for the generator G. The resistive element R2 converts that voltage to a current I1 which is supplied to a second operational amplifier OA2. The second operational amplifier OA2 has connected across the input and output terminals thereof in parallel circuit relationship a capacitive element C2 which is proportional to one over the spring constant K and a resistive element R3 which is proportional to one over the damping constant D, for the mechanical system shown in FIG. 2. The output voltage of the operational amplifier OA2 is designated V3 and it is proportional to the torque on the shaft between the generator G and the first turbine inertial mass T1. This is fed back through an inverter OA5 to the scaling resistor R1. This latter voltage V3 is also converted to a current I4, by a resistive element R5 which is part of the scaling network for a third operational amplifier OA3. This operational amplifier OA3 is utilized to represent the mass of the first turbine T1 and the capacitive element C3 is therefore related to the inertial mass of the turbine T1.

The output voltage V4 from the operational amplifier OA3 is fed back through an inverter OA4 and a resistive element R4 which converts the voltage V4 into a current I2 which is supplied to the input terminal of the previously described operational amplifier OA2. Also supplied to the input terminal of the previously described operational amplifier OA2 is a voltage $vtG1$ which in this case represents the voltage $vtG1$ shown being supplied to the input of the simulating system AEMS of FIG. 1. There is a resistive element R6 for converting this voltage $vtG1$ which represents torque to a current I3. It can be seen therefore that the currents I1, I2, and I3 are summed at the input of the operational amplifier OA2. As is apparent from examination of FIG. 1, that the torque voltage $vtq4$ shown therein is available from that portion of the circuitry in FIG. 4 generally identified as B". It can be seen that the simulating circuit AEMS of FIG. 1 can be formed by utilizing passive circuit elements as shown in FIG. 3 or active circuit elements as shown in FIG. 4.

It is to be understood that the circuit arrangements of FIGS. 3 and 4 are not limiting but are merely illustrative of potential or possible analog circuits which may be utilized in the simulating circuit AEMS of FIG. 1. It is also to be understood that the mechanical arrangement of the electro-mechanical system EMS shown in FIG. 1 is merely illustrative and typical and not limiting in any sense. It is also to be understood that the graph shown in FIG. 1a which represents the torque $tq4$ and voltage $vtq4$ is also not limiting but is merely illustrative.

The circuits and apparatus embodying the teaching of this invention have many advantages. One advantage lies in that fact that the various torsional oscillations or other mechanical characteristics of an electro-mechanical system can be simulated for utilization with control and supervision equipment or circuitry thus eliminating the need for measuring or detecting critical parameters in all critical parts of an electro-mechanical system. Generally one or two parameters is all that need be directly measured for the other parameters can be synthesized by utilizing the simulating systems AEMS previously described. Another advantage lies in the fact that the simulating system may utilize either passive or active elements. Another advantage lies in the fact that the system shown in FIG. 1 may be utilized with other control or protective devices.

What we claim as our invention is:

1. An analog supervisory system for simulating the torsional oscillation characteristic of an electro-mechanical power generating system, which latter system has rotatable masses therein which are interconnected by rotatable shaft, said shaft having mechanical resilience, said electro-mechanical system having mechanical damping, said mechanical resilience, said mechanical damping and said masses having the capability of causing torsional oscillation in said shaft when said shaft rotates, said generating system having an output electrical generator with terminals, comprising:

transducer detecting means interconnected with said electro-mechanical system for measuring the real component of electrical power provided at said terminals of said output electrical generator in said electro-mechanical system for thus detecting shaft torque in a local part of said shaft and thus providing an output signal having a value related to said local shaft torque;

analog simulating means adjusted to represent said masses, said shaft damping and said resilience of said electro-mechanical system, said transducer detecting means output signal being provided to said analog simulating means to cause said analog simulating means to thereby simulate a torsional oscillation in said shaft relative to any of said masses;

shut-down means interconnected with said analog simulating means and said electro-mechanical system to shut said electro-mechanical system down if a predetermined torsional oscillation value is achieved; and fault detecting means for detecting an electrical fault current at said terminals of said output electrical generator, a signal having a value which is relative to said fault being provided by said fault detecting means to said shut-down means to disable the shut-down of said electro-mechanical system until the effect on said generator of said fault has been reduced.

2. The combination as claimed in claim 1 comprising indicating means interconnected with said analog simulating means for providing an indication of said torsional oscillation.

3. The combination as claimed in claim 1 wherein said analog simulating means comprises an analog computer having electrical inductance, electrical capacitance and electrical resistance for simulating said mechanical resilience, said mechanical damping and said masses in said electro-mechanical system.

4. The combination as claimed in claim 3 wherein said mechanical damping is generally simulated by said electrical resistance, said masses are generally simulated by said electrical inductances and said mechanical resilience is generally simulated by said electrical capacitance.

5. The combination as claimed in claim 1 wherein said fault detecting means comprises a volt-amps reactive transducer for measuring reactive power.

6. The combination as claimed in claim 2 wherein said indicating means comprises means with frequency response sufficiently large to indicate the effect of said electrical fault on said torsional oscillation of said shaft.

7. The combination as claimed in claim 6 wherein a signal related to said fault being provided by said fault detecting means to said indicating means to actuate said indicating means when a fault appears on said generator to allow said indicating means to indicate the effect of said fault as that effect is propagated through said electro-mechanical system.

8. The combination as claimed in claim 7 wherein said indicating means comprises an oscillograph.

9. The combination as claimed in claim 2 wherein said indicating means comprises a recorder.

10. The combination as claimed in claim 2 wherein said indicating means comprises a counter.

11. The combination as claimed in claim 2 comprising a level detector means for actuating said indicating means, said level detector means actuating said indicating means to indicate only those portions of torsional oscillation above a predetermined value.

12. The combination as claimed in claim 1 comprising speed synchronizing means to compare the actual speed of said shaft at any instant of time with the simulated speed of said shaft as provided by said analog simulating means, said speed synchronizing means having feedback means to said analog simulating means to adjust said simulated speed to be generally equal to said actual speed to thereby increase the accuracy of said analog simulating means.

* * * * *